United States Patent Office 3,508,928
Patented Apr. 28, 1970

3,508,928
METHOD FOR MAKING CULINARY PREMIXES
George Ewing, Minneapolis, Robert L. Holland, Rosemont, and George E. Johnson and Robert F. Kozlik, Minneapolis, Minn., assignors to General Mills, Inc., a corporation of Delaware
No Drawing. Filed Nov. 10, 1966, Ser. No. 593,278
Int. Cl. A23c 1/10
U.S. Cl. 99—94                                   12 Claims

ABSTRACT OF THE DISCLOSURE

A method for forming a culinary premix comprised of flour and sugar, by subjecting flour and sugar particles to impact forces whereby the particles are finely ground. The sugar particles impinge against the flour particles during impact, and cause the starch cells to be ruptured to a greater extent, than if the flour alone is subjected to impact forces. Culinary mixes which includes the premix, exhibit a greater tolerance to the addition of improper amounts of liquid during the batter forming stage.

---

This invention relates to culinary mixes used in making baked products, and more specifically to an improved method for making a premix which can be combined with other ingredients to form a mix which will make an improved culinary product. While the premix might be used for making a number of culinary products, it will be described in conjunction with products such as layer cakes.

Prepared mixes formed from ingredients such as flour, sugar, shortening, flavoring, leavening, and the like, are well known in the art. The increased use and popularity of such mixes by the housewife, as well as others, can be attributed at least partly to their convenience and resulting good end product. As is well known, such mixes are combined with an aqueous liquid such as water, plus, in some cases, eggs, to make a batter which is then baked. To be successful, the prepared mix must produce a resulting product when baked, which meets the approval of the baker as well as the ultimate consumer.

There are a number of characteristics by which a culinary product, such as a layer cake, is judged. First of all, as to the mix, there are a number of requisites which it must possess. One important factor which affects the outcome of the product, concerns the ability of a mix to tolerate the addition of an improper amount of liquid during the batter forming stage. Normally the recipe specifies that a predetermined amount of water must be combined with a predetermined amount of mix to form the batter. Not infrequently, the wrong amount of liquid is added, either through inadvertence or on purpose. It has been observed for example, that too much liquid is sometimes added in the mistaken belief that this will add moistness to the baked product. Thus, efforts have been made to create a culinary mix having an increased liquid tolerance; liquid tolerance being the margin of error or range of the quantity of liquid which can be added to the mix and still produce a good batter and a high quality cake. As to the product itself, there are a number of characteristics by which its quality is judged. One such characteristic is its volume, with respect to the amount of mix used. In general, it is desired that the cake have as large a volume as possible without sacrificing other desirable qualities. As known in the art, one method for determining a cake's volume is by a measurement of its volume in cubic centimeters per pound. Therefore, efforts are constantly being made to improve the technology pertaining to culinary mixes so as to overcome disadvantages which still exist in the state of the art.

It is known in the art that the capacity for absorbing and retaining moisture by flour can be increased by damaging or rupturing the starch cells contained in the flour particles. While increased starch damage may not be desirable in all instances in which flour is used for making a culinary mix, it has been discovered that in many instances the quality of a culinary mix and the product it produces, can be improved as to liquid tolerance and volume by using a flour in which the starch cells have been damaged or ruptured. Various procedures have been devised for accomplishing the rupture or partial rupture of the starch cells. One procedure for example, involves subjecting the flour to the action of moisture and heat, e.g. by injecting steam into the flour to be treated. Another process concerns applying heat and pressure to the flour while it is in a dry powdery state by the use of rollers, for example. Fine grinding of the flour by the use of conventional equipment is another method by which a certain amount of starch damage can be obtained. It has been observed that the known methods for accomplishing the desired starch damage have not been entirely satisfactory for all purposes. For example, if steam is used, accurate regulation of the amount of steam used is ofttimes difficult; moreover, discoloring of the flour might result. Moreover, known methods have not resulted in obtaining the amount of starch damage which might be desired. It should also be borne in mind that the starch damage should be obtained without gelatinization of the particles.

Prior art methods of milling flour normally produce a flour having starch damage which ranges from about 1.5% to 3.5% depending upon the type of flour used, the geographical area from which the wheat was produced, the type of equipment used, and the like. It has been found that by increasing the starch damage to a greater extent, e.g. 4–8%, and preferably at least 5%, an improved mix can be obtained as to liquid tolerance, the batter is more firm, and the product produced, such as a layer cake, is improved as to volume, moistness, crust, tenderness, and general texture. As known to those in the art, the extent of starch damage present in a sample of flour can be measured by an enzyme susceptibility test.

Accordingly, one object of the present invention is to provide an improved method for making a culinary mix.

Another object is to provide a method for making a culinary mix having a high tolerance to the addition of an improper amount of liquid during the batter forming stage.

A further object is to provide a method for making a culinary premix in which flour particles are subjected to forces which cause the starch cells in the flour to become damaged or ruptured.

A still further object is to provide a method for making a culinary premix including flour and sugar, in which the premix is subjected to impact forces whereby the flour and sugar particles are finely ground and the sugar particles aid in damaging or rupturing the starch cells of the flour.

Other objects and advantages will become apparent from a consideration of the following detailed description of the invention.

In general, the invention involves preparing a culinary premix comprised of flour and sugar, which is subsequently combined with other ingredients to form a complete mix. The premix ingredients are combined and blended to form a homogeneous mixture which is subjected to impact forces of sufficient magnitude so as to cause the flour and sugar particles to be finely ground. The other ingredients which form the total mix, such as the flavoring and leavening ingredients, shortening, and the like, are thereafter blended with the premix to form the total mix which is then stored and/or packaged for ultimate use. It has been discovered that simultaneously subjecting the flour and sugar particles to impact forces causes the particles to be finely ground into minute particles, and it causes the sugar particles to impinge against the flour particles so as to damage or rupture the starch cells to a greater extent than if the flour alone is subjected to impact forces. This enables the flour to readily absorb more moisture than it otherwise can. The premix when combined and blended with the other ingredients, produces a batter when the liquid is added, which results in an improved cake.

As background, it is believed that a better understanding of the present invention will be obtained if at least one method known in the art for making cake mixes, is briefly reviewed. According to this method, the flour component of the mix is dried and then fed through an impact mill wherein it is reduced to a prescribed particle size. Approximately three-fourths of the sugar called for in the mix formula is combined in powdered form with the milled flour; the remaining sugar being added in granulated form to the resulting mixture (in this regard, the larger particle size granulated sugar is added to enhance the free flowability of the mix). As an alternative, all the sugar might be used in granulated form, and a separate mill provided for producing the desired fine ground sugar which is then blended with the milled flour. Shortening, which is to be incorporated in the mix, is prepared by plasticizing it in a manner well known in the art, after combining it with a suitable emulsifier to produce a suitable shortening. The flour-sugar premix is then combined with the other ingredients by appropriate means to form the total mix.

The present invention concerns the formation of the flour-sugar premix by a process which differs from the above described process, so as to produce an improved mix and product. In practicing the present invention, the flour and sugar are first combined and admixed together to form a blended mixture which is then subjected to impact forces within an impact mill. By impact milling is meant disintegration or shattering of a majority of the particles by impact as opposed to crushing, for example. While it is not fully understood what happens when the flour and sugar are impact milled in the pesence of each other, it is believed that as the flour-sugar mixture passes through the impact mill, the sugar granules or particles break down into small sharp fragments or pieces which abrade, fracture, or cut into the flour particles without becoming bonded thereto, thereby rupturing or damaging the starch cells and increasing the surface area of the flour particles. As a result, moisture absorption of the flour particles is increased, and tolerance to excessive amounts of liquid is improved. It might also be mentioned that tolerance to an undermeasurement of liquid is not impaired. When a cake mix containing such flour particles is blended with what would normally be an improper amount of liquid, the resulting batter nevertheless produces a high quality cake.

Before proceeding with a detailed description of the methods by which the premix can be made, as well as specific examples of representative products prepared by using such a premix, the basic ingredients which form the premix, i.e., flour and sugar, as well as the type of impact equipment which might be used, will be briefly described. It has been found that a number of well known and commercially available impact milling devices can be used for providing the impact forces required in practicing the invention. Mechanical impact mills having hammers and/or whizzers therein which impact against the particles and aid in moving them through the grinding chamber have been used with excellent results. Illustrative of the type of mill which might be used is a Raymond Vertical Mill, a Schutz-O'Neill Mill, an Alpine Pin Mill, as well as others. Generally, in such machines a plurality of hammers and/or whizzers are mounted within a grinding chamber in such a manner that the hammers are caused to rotate about a prescribed axis. The material to be pulverized is admitted into the chamber where the particles are accelerated to a high speed by the rotating hammers, and they are rapidly reduced in size by attrition with the hammers and the walls of the grinding chamber. Air, having the required velocity, enters the chamber and carries the finely divided material to appropriate classifiers wherein the particles are separated from the air. Another type of impact device which might be used is a fluid energy mill which utilizes a high velocity fluid medium for causing the particles to collide with each other; such devices are also well known in the art.

Generally, the flour used can be any of those customarily used in making cake mixes. Preferably, it should be bleached cake flour derived from a soft wheat; such flour has a high starch content and it has a relatively small particle size (the average particle size of cake flour being about 25–45 microns in diameter). Suitable sugars for use comprise any of the commonly used granular sugars including sucrose, dextrose, maltose, fructose, and lactose. Preferably, the sugar particles should have a relatively coarse particle size. In this regard, sugar which is rated "regular granulated" and "baker's special" have been used with satisfactory results. Regular granulated sugar is defined herein as sugar having a particle size which is such that not more than five percent (5%) by weight of a representative sample is retained on a No. 35 U.S. Standard sieve, and not more than twenty percent (20%) by weight of the sugar passes through a No. 100 U.S. Standard sieve. Baker's special sugar is defined as sugar having a particle size which is such that of a representative sample of such sugar, not more than ten percent (10%) by weight is retained on a No. 60 U.S. Standard sieve, and not more than thirty percent (30%) passes through a No. 120 U.S. Standard sieve. By comparison, according to the prior art, the particle size of the sugar which is usually added to the cake mix as fine or powdered sugar is such that substantially all of the sugar will pass through a No. 230 U.S. Standard sieve. The other ingredients forming the total mix are commercially available and will not be specifically described.

The specific amount of each ingredient in the premix can vary depending upon the ultimate product to be made, the quality desired, etc. It has been found that the ratio of flour to sugar in the premix might range from a ratio of 20 parts flour and 80 parts sugar, to 80 parts flour and 20 parts sugar. In cake mixes, the amount of each ingredient will depend upon the type of cake mix to be produced, whether it be white, yellow, chocolate, or some other flavor. Moreover, the amount of sugar included in the premix depends upon whether part of the sugar is to be added to the total mix as granulated sugar. Generally, the sugar comprises about 40–50% of a total cake mix, and the flour about 30–45% of the mix. Moreover, the ratio of flour to sugar in a cake premix might range from about 35–55% flour to 45–65% sugar; bearing in mind of course that part of the sugar might be added as granulated sugar to the total mix.

The following table illustrates a number of examples by which the flour-sugar ratio might be varied, as well as the amount of sugar included in the premix and the amount added as granular sugar:

better distribution of the shortening and/or emulsifier throughout the mix, so that the particles of dry ingredients are covered with a thin coating of shortening and/or emulsifier.

TABLE I

| | | | | 55:45 ratio | | | | | | 49:51 ratio | | | | |
|---|---|---|---|---|---|---|---|---|---|---|---|---|---|---|
| Cake mix flavor | Total sugar and flour in mix, percent | Total flour in mix, percent | Total sugar in mix, percent | Flour-sugar premix in mix, percent | | | Coarse sugar in mix, percent | Amount total sugar in premix, percent | Amount total sugar added as granular sugar, percent | Flour-sugar premix in mix, percent | | | Coarse sugar in mix, percent | Amount total sugar in premix, percent | Amount total sugar added as granular sugar, percent |
| | | | | Total | Percent flour | Percent sugar | | | | Total | Percent flour | Percent sugar | | | |
| White | 81.60 | 38.00 | 43.60 | 69.09 | 38.00 | 31.09 | 12.51 | 71.3 | 28.7 | 77.55 | 38.00 | 39.55 | 4.05 | 90.7 | 9.3 |
| Yellow | 76.17 | 37.10 | 30.07 | 67.45 | 37.10 | 30.35 | 8.72 | 77.6 | 22.4 | 75.71 | 37.10 | 38.61 | 0.46 | 98.8 | 1.2 |
| Chocolate | 72.66 | 33.60 | 39.06 | 61.09 | 33.60 | 27.49 | 11.57 | 70.4 | 29.6 | 68.57 | 33.60 | 34.97 | 4.90 | 89.5 | 10.5 |

The above table shows that for a white cake premix having a flour-sugar ratio of 55:45, all of the flour (38.0%) but only 31.09% of the sugar (based on total mix) is subjected to impact forces. The remaining sugar, 12.51%, is added to the total mix as coarse or granulated sugar. Note that 71.3% of the total sugar is included in the premix and 28.7% is added as granular sugar. In contrast, observe that for a yellow cake premix having a flour-sugar ratio of 49:51, all of the flour (37.10%) and 38.61% of the sugar are subjected to impact forces. The remaining sugar, 0.46%, is added as granulated sugar. Based on total sugar, 98.8% of it is included in the premix and only 1.2% is added as granular sugar. It should be realized of course, that various ratios might be used, that different amounts of flour and sugar might be included in the mix formula, that all of the sugar as well as all of the flour, might be subjected to impact forces, and the like.

The premix is formed by combining and blending the flour and the desired amount of sugar together to form a homogeneous mixture. If desired, both of the ingredients might be dried to a prescribed moisture level prior to blending them together. Any suitable prior art blending apparatus by which flour is blended with other ingredients can be used for the blending step, such as a ribbon blender, a double cone blender, continuous blender, or the like. Although some reduction in particle size may be obtained in the mixing step, especially as to the larger particles, such size reduction is not significant. The blended flour-sugar mixture is admitted into a fine grinding impact mill, such as a Raymond Vertical Mill, where the particles are subjected to impact forces of sufficient magnitude to reduce their particle size. As known to those skilled in the art, such impact mills can be adjusted so that the average diameter of the flour particles discharged from the mill can be controlled, for example, 15–20 microns or less. After being discharged from the impact mill, the premix is blended with the other dry ingredients called for in the particular cake mix being prepared, such as the leavening, non-fat dry milk solids, salt, flavoring, the granulated sugar, etc., by additional blending equipment. The resulting homogeneous blend of dry ingredients is then combined and admixed with the shortening called for in the formula. This might be accomplished for example, by extruding plastic shortening through an extrusion die into the blender so that the strands of shortening are forced directly into the moving stream of dry ingredients. If desired of course, a fluid shortening having the desired characteristics might also be used. Moreover, if preferred, an emulsified shortening might be used as the shortening ingredient. The shortening and the dry ingredients are then fed through a finishing device to reduce the lumps in the shortening to the proper size. The impact milling increases the surface area of the particles, and this permits more intense finishing, which results in a It should be realized that a number of variations to the above described method might be practiced. For example, it might be preferred to combine all the sugar called for in the formula with the flour and subject the resulting mixture to impact forces. Moreover, it might be preferred to eliminate the drying of the flour and/or sugar prior to blending them together, and in lieu thereof, provide means for heating the air which is admitted into the impact mill during the impact stage; when this is done, the premix is dried to a desired moisture level while in the mill before it is discharged therefrom. It is emphasized that part of either the sugar or flour required in the total mix might be omitted from the mixture which is fed into the impact mill, and added at a later time with the other dry ingredients. However, to best achieve the desired results of the present invention, a substantial portion of both the sugar and the flour should be subjected to impact forces as disclosed hereinbefore, because by so doing, a finer particle size is obtained, and a greater degree of starch damage of the flour is accomplished.

Numerous culinary products can be made according to the present invention. The following specific examples illustrate cake mixes prepared according to the present invention.

EXAMPLE I

A white cake mix and cake was prepared from the following ingredients:

| Ingredients: | Percent by weight |
|---|---|
| Sugar—granulated | 43.60 |
| Flour—cake | 38.00 |
| Shortening and emulsifier—plastic | 10.15 |
| Nonfat milk solids | 3.89 |
| Leavening | 2.71 |
| Salt | .85 |
| Pregelatinized corn starch | .50 |
| Flavoring | .30 |

A premix was prepared by combining all of the flour and about 31% of the sugar (based on total ingredients) and blending them together in a ribbon blender so as to form a homogeneous mixture. The flour and sugar thus comprised about 69% of the total mix, and of this amount, the ratio of flour to sugar was 55.45. The flour had a moisture content of about 14%, while the moisture content of the mixture was about 7%. The average particle size of the flour was about 35–40 microns, and the starch damage of the flour was measured as being about 2.5%. The mixture was admitted into a Raymond Vertical Mill having a 4–4 whizzer setting and 4 hammers, at a feed rate of about 20 pounds per minute. A steam heater was affixed to the mill for heating the air pulled into the mill to a temperature of about 125° F. While in the impact mill, the particles were subjected to impact forces caused by the hammers, so that the flour and sugar particles were finely ground and the starch cells of the flour were ruptured. The resulting average particle size of the flour ranged from about 5–15 microns, and the starch damage was measured at about 5.5%. The premix of flour and sugar when discharged from the mill had a temperature of about 115° F., it had a moisture content of about 4%, and about 95% of the premix passed through a No. 230 U.S. Standard sieve. The premix was conveyed to another ribbon blender where it was combined with the remaining 12.5% of the granulated sugar, the nonfat milk solids, the leavening ingredients, and the other dry ingredients. The emulsified shortening was also admitted into the ribbon blender and combined with the other ingredients. The resulting blended mixture was processed in a cake mix finisher so as to disintegrate lumps which might be present. Thereafter the mix was stored for future packaging and use.

A cake was prepared by combining and blending 540 grams of the above mix with 300 milliliters of water and the whites of two eggs, to form a homogeneous batter. The resulting batter was poured into two 8 inch cake tins and baked at a temperature of 350° for about 30 minutes. The resulting cake possessed excellent characteristics as to volume, moistness, tenderness, and the like.

EXAMPLE II

A cake was prepared by combining and blending 540 grams of the mix prepared in Example I, with 360 ml. of water and the whites of two eggs. Normally, such an increased amount of liquid would markedly degrade the quality of the cake. A comparison of the two cakes however, showed that the cakes attained a general rating of excellent, and the volumes of both cakes were adjudged above normal.

EXAMPLE III

A cake was prepared by combining and blending 540 grams of the mix prepared in accordance with Example I, with 270 ml. of water and the whites of two eggs. In many instances, the omission of this much liquid would tend to make the cake excessively dry and generally not satisfactory. When compared to the cake produced in Example I, it was observed that the present cake had an overall good rating and it was considered generally acceptable as to such characteristics as moistness, volume, tenderness, crust, and the like.

EXAMPLE IV

A yellow cake mix and cake was prepared from the following ingredients:

| Ingredients: | Percent by weight |
|---|---|
| Sugar—granulated | 45.74 |
| Flour—cake | 37.10 |
| Shortening and emulsifier—plastic | 10.00 |
| Nonfat milk solids | 3.50 |
| Leavening | 1.95 |
| Salt | .85 |
| Pregelatinized corn starch | .50 |
| Flavoring | .30 |
| Colorant | .06 |

A premix was prepared by combining all of the flour and all of the sugar and blending them together to form a homogeneous mixture. The flour was dried by appropriate means prior to blending it with the sugar, so that its moisture level was reduced from about 14% to about 9.5%; its starch damage was about 2.5%; and its average particle size was about 25–30 microns. The blended mixture was admitted into a Raymond Mill having a whizzer setting of 8—8 at a feed rate of about 30 pounds per minute, where it was subjected to impact forces. Since the flour was dried prior to blending it with the sugar, the temperature of the air admitted into the mill was at room temperature, rather than at an elevated temperature. The impact forces within the mill caused the particles to be finely ground and the starch damage of the flour was increased to about 6%. The premix when discharged from the mill was conveyed to a ribbon blender where it was combined and blended with the other ingredients to from the final mix.

A number of cakes were prepared by using 540 grams of the above mix, and varying amounts of water, as set forth in the above examples, in substantially the same manner as described above except that two whole eggs were used in lieu of only egg whites. The resulting cakes were adjudged satisfactory as to the usual cake judging qualifications.

The above examples illustrate several methods of producing culinary products, such as layer cakes. While the ingredients used and the steps involved can vary somewhat, it should be borne in mind that the essential part of this invention resides in the manner of producing a premix, comprised of flour and sugar, which can then be used for making a number of different culinary products. As disclosed herein, all or part of the flour and sugar called for in the formula, are subjected to impact forces whereby the particles are finely ground and the flour particles sustain a higher degree of starch damage than normally attainable by using conventional milling equipment and methods. It is recognized that minor variations and changes in practicing the invention will be apparent to those skilled in the art, it is intended however, that this invention shall cover all such changes and modifications.

In the above description, a disclosure of the principles of this invention is presented, together with some specific examples by which the invention might be carried out. Now therefore, we claim:

1. A method for forming a culinary premix having a high tolerance to the addition of an improper amount of liquid when combined with liquid ingredients to form a batter, said method comprising subjecting a mixture of flour and sugar particles in the absence of shortening, to impact forces of sufficient magnitude whereby the particles are finely ground and the surface area of the particles is increased, the sugar particles impinging against the flour particles during impact thereby aiding in fine grinding the flour particles and rupturing the starch cells contained in the flour, the starch damage of said flour particles being increased to at least 4%.

2. The method of claim 1 wherein the mixture comprises about 20–80 parts flour and about 20–80 parts sugar.

3. The method of claim 1 wherein the mixture comprises about 45–55 parts flour and about 45–55 parts sugar.

4. The method of claim 1 wherein granular sugar is combined with the flour particles.

5. The method of claim 1 wherein the starch damage of the impacted premix ranges from about 4–8% as measured by an enzyme susceptibility test.

6. The method of claim 1 wherein the starch damage of the impacted premix is at least 5% as measured by an enzyme susceptibility test.

7. The method of claim 1 which includes subjecting the flour and sugar particles to a heated gaseous medium simultaneously with impact forces, the moisture content of said particles thereby being reduced to a prescribed level.

8. A method for forming a culinary premix having a high tolerance to the addition of an improper amount of liquid when combined with liquid ingredients to form a batter, said method comprising combining and admixing flour and sugar particles together in the absence of shortening, thereby forming a homogeneous mixture, admitting said mixture into an impact apparatus, said apparatus creating impact forces of sufficient magnitude whereby the flour and sugar particles are finely ground, said sugar particles impinging against the flour particles within the apparatus thereby causing the starch damage of the flour to be increased to a range of 4–8% as measured by an enzyme susceptibility test, at least the major portion of said sugar particles remaining separated from said flour particles.

9. A method for forming a premix containing flour and sugar particles which comprises admitting a predetermined amount of said sugar particles into an impact apparatus, admitting a predetermined amount of said flour particles into said apparatus, admitting a heated gaseous medium into said apparatus, and subjecting said sugar and flour particles to impact forces while in the impact apparatus whereby the particle size of the flour and sugar is reduced and the sugar particles impinge against the flour particles thereby causing the starch damage of the flour particles to be increased to at least 5% as measured by an enzyme susceptibility test, and the average particle size of the flour particles to be reduced to about 10–20 microns.

10. A method for forming a culinary mix having a high tolerance to the addition of an improper amount of liquid when combined with liquid ingredients to form a batter and which includes flour, sugar, shortening, and other minor ingredients, said method comprising combining and admixing the flour and at least a portion of the sugar in the absence of shortening to form a homogeneous mixture, subjecting said mixture to impact forces whereby the particles are finely ground and the sugar particles aid in rupturing the starch cells contained in the flour, the starch damage of said flour particles being increased to at least 4%, combining and blending the resulting premix with the remaining sugar and the other ingredients including shortening, to form the mix.

11. The method of claim 10 wherein the premix is comprised of all the flour and about 70–80% of the sugar, the ratio of flour to sugar in the premix being about 55 parts flour to about 45 parts sugar, the remaining 20–30% of the sugar being combined with the premix as granular sugar.

12. The method of claim 10 wherein the premix is comprised of all the flour and about 85–100% of the sugar, the ratio of flour to sugar in the premix being about 49 parts flour to about 51 parts sugar, any remaining sugar being combined with the premix as granular sugar.

References Cited

UNITED STATES PATENTS

| 2,874,052 | 2/1959 | Bedenk | 99—94 |
| 3,039,878 | 6/1962 | Ganske | 99—94 |

FOREIGN PATENTS

| 699,657 | 12/1964 | Canada. |

RAYMOND N. JONES, Primary Extminer